Figure 3:
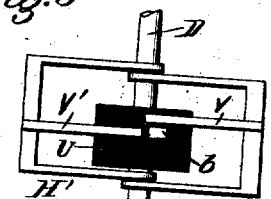
Figure 3A:
Figure 3B:
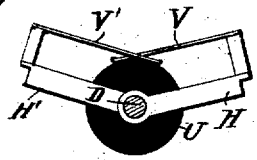
Figure 3C:
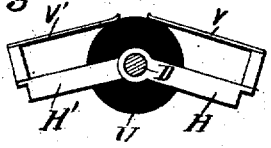
Figure 5:
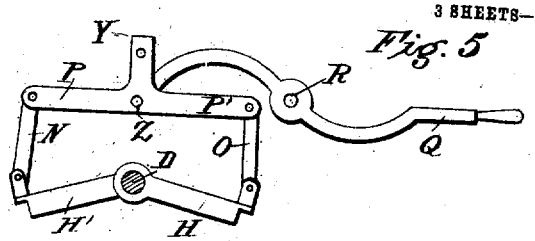
Figure 6:
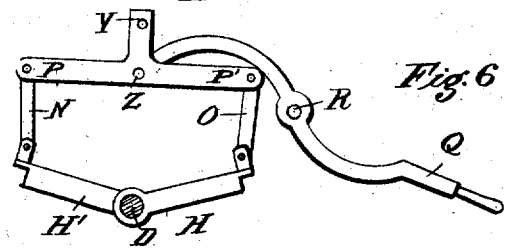
Figure 7:
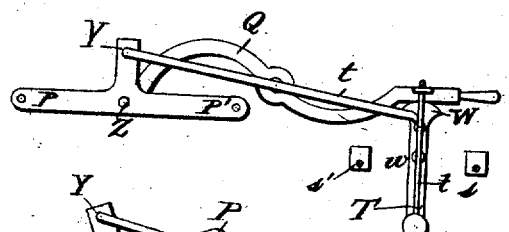
Figure 8:
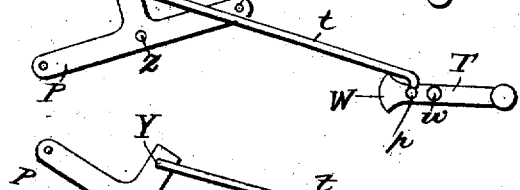
Figure 9:
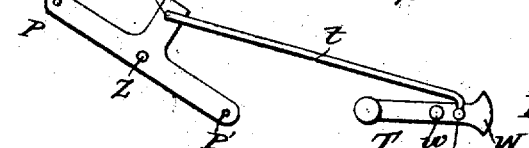

No. 868,476. PATENTED OCT. 15, 1907.
E. P. DU PONT.
GAS ENGINE REVERSING SWITCH.
APPLICATION FILED JAN. 3, 1907.
3 SHEETS—SHEET 1.
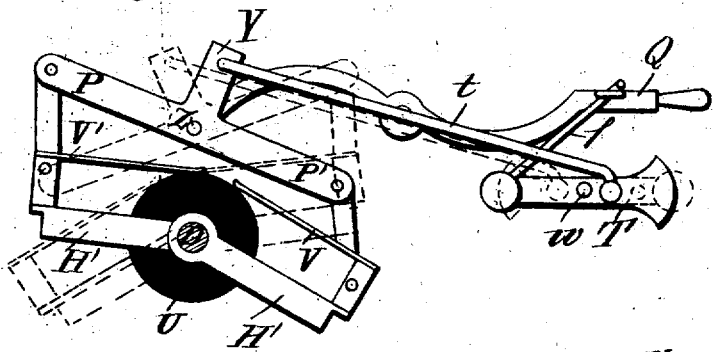
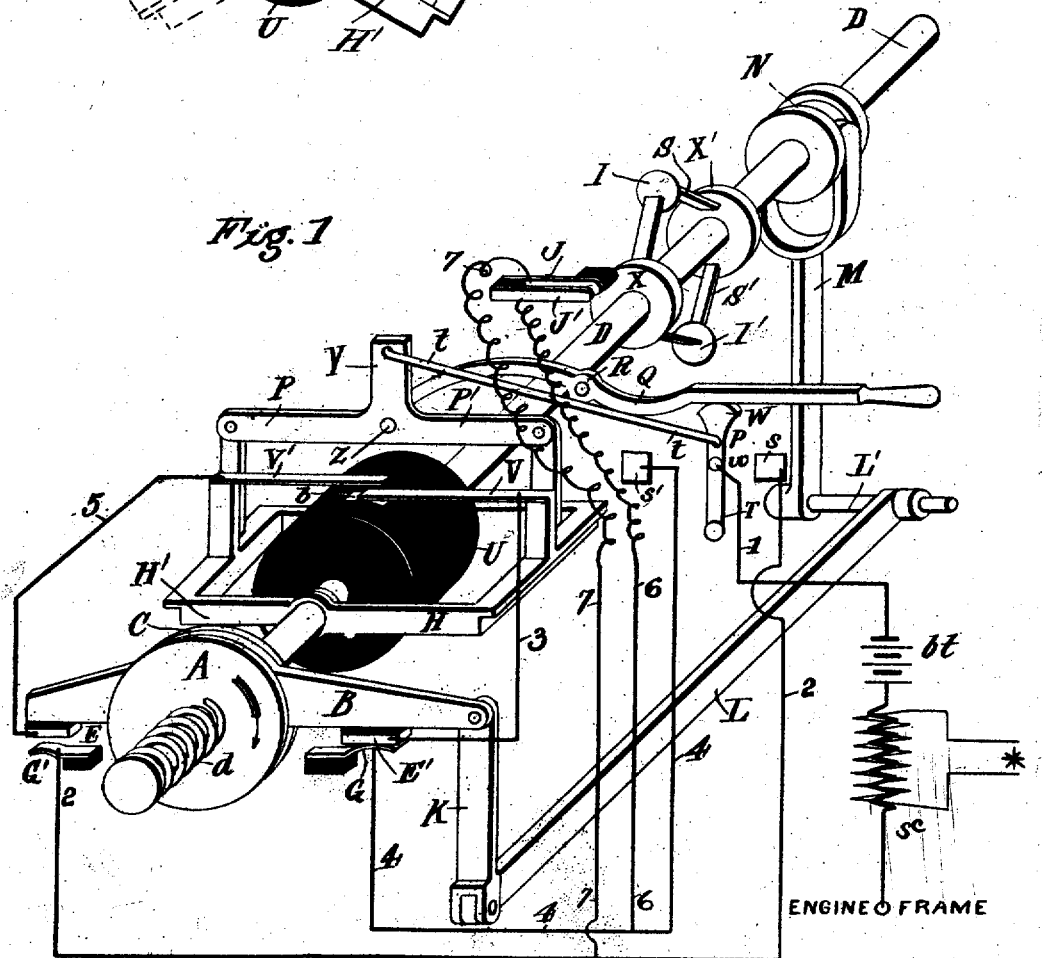
WITNESSES
C. Shliffey
Edw. A. Byrn.
INVENTOR
ELEUTHERE PAUL DU PONT
BY Munn & Co.
ATTORNEYS

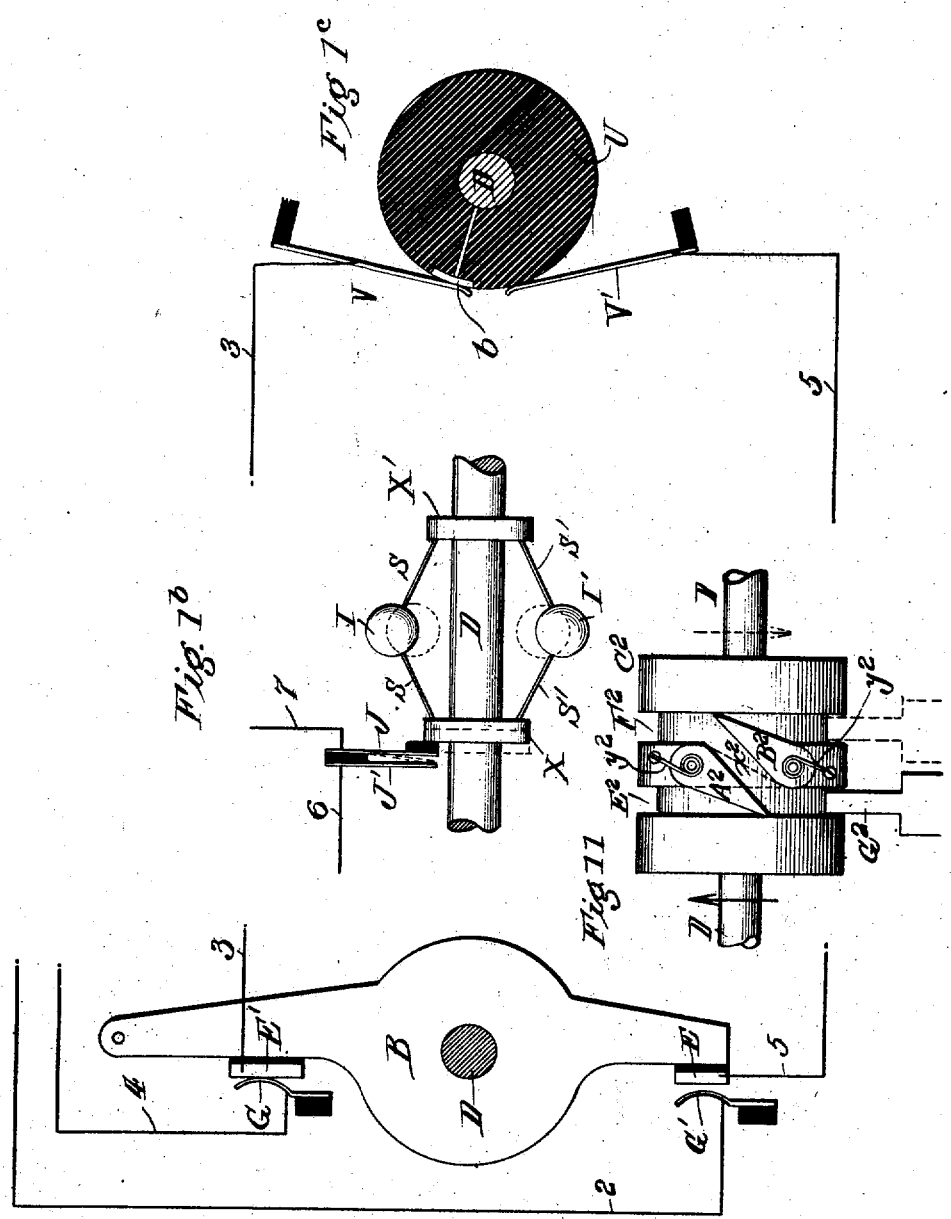

No. 868,476. PATENTED OCT. 15, 1907.
E. P. DU PONT.
GAS ENGINE REVERSING SWITCH.
APPLICATION FILED JAN. 3, 1907.

3 SHEETS—SHEET 3.

WITNESSES
C. E. Duffey
Edw. P. Byrn

INVENTOR
ELEUTHÈRE PAUL DU PONT
BY Munn & Co.
ATTORNEYS

UNITED STATES PATENT OFFICE.

ELEUTHERE PAUL DU PONT, OF MONTCHANIN, DELAWARE.

GAS-ENGINE-REVERSING SWITCH.

No. 868,476.     Specification of Letters Patent.     Patented Oct. 15, 1907.

Application filed January 3, 1907. Serial No. 350,593.

*To all whom it may concern:*

Be it known that I, ELEUTHÈRE PAUL DU PONT, a citizen of the United States, and a resident of Montchanin, in the county of Newcastle and State of Delaware, have invented certain new and useful Improvements in Gas-Engine-Reversing Switches, of which the following is a specification.

My invention is designed to provide a means for reversing the direction of revolution of a gas-engine, employing an electric spark device. Inasmuch as the explosion of the gas must take place in a certain and definite relation to the position which the crank occupies in its revolution around the shaft, it will be seen that any circuit controller which times the spark to this relation of the crank must in any reversing mechanism be correspondingly changed to time the spark to the new direction of revolution.

My invention is designed to provide a device for the purpose so constructed and arranged that the gas engine may be reversed as to its direction of revolution by the simple manipulation of a switch without the mechanical elements of the usual reversing gear.

Figure 1 is a perspective view of the essential parts of my reversing device shown detached from their supporting parts and shown in connection with a diagram of circuits with which they coöperate. Fig. 1ª is a detail in side view of a friction switch. Fig. 1ᵇ is a detail in side view of a governor switch. Fig. 1ᶜ is a sectional detail of the circuit controller. Figs. 2 to 10 are detail views of the brush shifting devices for the spark circuit controller, and Fig. 11 is a modification of the device for shifting the shaft.

Referring to Fig. 1, D represents the shaft of a gasolene engine which in the ordinary four cycle engine is what is known as the cam shaft or in the two cycle engine is its main crank shaft. On one end of said shaft are mounted two disks A and C. The disk C is fastened rigidly to the shaft while the disk A is loose thereon and capable of sliding parallel to the axis of the shaft and is kept pressed toward the disk C by means of a coil spring $d$ arranged on the end of the shaft and bearing at one end against a collar on the shaft and at the other end against the disk A. Between the disks A and C is arranged a friction switch B. This consists of a central disk portion with two opposite arm-like extensions, Fig. 1ª. This friction switch is pressed against the disk C by means of the disk A and therefore has a frictional engagement with them both but is loose and free to turn upon the shaft D. The rotary tension of this friction has a tendency to rock the friction switch B about the shaft D in one direction or the other according to the direction of revolution of said shaft D. This rocking action of the friction switch B is restricted by the system of levers K, L, M, of which K is a link pivoted to the outer end of one of the arms of the friction switch and also pivoted at its lower end to the horizontal arm L which by means of an axial connection L' is rigidly connected to the upright arm M. The axial connection L' is suitably journaled in a bearing in the framework, not shown, and the upper end of the arm M is forked and provided with two pins which travel in a peripheral groove in a hub N fast on and revolving with th shaft D.

H, H' are two brush holders for the circuit controller for making the spark for the igniter. These brush holders are separately provided with oppositely arranged brushes V and V' which bear upon the peripheral surface of a circuit controller U which consists of a non-conducting hub fast upon the shaft D and provided with a metallic bearing contact $b$ on its periphery which is electrically connected to the metallic shaft as shown in Fig. 1ᶜ. The circuit controller brush holders H and H' consist of yoke shaped pieces whose inner ends embrace and turn upon the shaft D and they are individually rocked on said shaft D by the double bell crank lever P, P' fulcrumed at Z to the end of a main lever Q. This lever has a stationary fulcrum at R upon some portion of the framework, which is not shown.

I, I' are two balls of a centrifugal governor mounted upon the inner ends of springs S, S', the outer ends of which springs are connected on one side to the rigid collar X' fast on the shaft D and the other ends of which springs on the opposite sides of the balls are connected to a loose disk X capable of sliding longitudinally on the shaft D, Fig. 1ᵇ. J and J' are two terminal spring contacts, respectively, connected to the two branches of the circuit hereafter described and one of which springs J is provided on one side with a non-conducting bearing adapted to be acted upon by the longitudinally sliding collar X. These parts are so arranged that when the speed of the shaft D is at its normal or maximum rate of revolution the centrifugal action of the balls I, I' throws out the springs S and S' and draws the collar X away from contact with the terminal J of said electrical circuit. But when the speed of the shaft D falls to a certain low rate of revolution, then the natural elasticity of the springs S and S' throws the balls I, I' toward the shaft D and thrusts the collar X against the terminal J and forces it into contact with its companion terminal J' to close an electrical circuit through these terminals, as seen in dotted lines in Fig. 1ᵇ and hereafter more fully described.

Referring to Fig. 1 the brush V is designed to make contact with the circuit controller plate $b$ when the shaft D is running in one direction and the timing of its relation to the circuit controller plate $b$ is determined in two ways, one by the lifting of the brush holder H through the double crank lever P, P' and the main hand lever Q. Its other timing adjustment in relation to the circuit controller plate $b$ is effected by the rocking of the double crank lever P, P' about its center Z and this is effected by the upward extension Y of the double bell crank and the attached connecting rod $t$. The brush V is designed to make the sparking contact with the plate $b$ when the shaft D is revolved in one direction and the brush V' is designed to make contact with the plate $b$ when the shaft D is revolved in the opposite direction when the engine is to be reversed. So long as the brush V and contact plate $b$ are in the same vertical transverse plane the brush V only is active in its sparking effect in relation to the plate $b$. To bring the other brush V' into operative relation with the contact plate $b$ of the circuit controller it is necessary to shift the circuit controller U and the main shaft D longitudinally so as to throw brush V off of contact with plate $b$ and bring brush V' into the transverse plane of said contact plate $b$. To accomplish this result is the purpose of the lever connections K, L, M. When the shaft D is revolved clockwise or in the direction of the arrow in Fig. 1 the stress of the frictional engagement of the disks A and C upon the friction switch B has a tendency to force the link K downwardly, rocking the lever arm L with it, and through the rock shaft L' and the upwardly projecting arm M, and its fork, produces on the hub N and shaft D an endwise movement of the entire shaft, shifting the shaft longitudinally and consequently bringing with it the circuit controller U and carrying the metallic contact plate $b$ of the circuit controller underneath the brush V. If the direction of movement of the shaft D be reversed to that shown by the arrow, then the frictional stress of the disks A, C, on the friction switch B will tend to lift the link K and arm L and rocking the upright arm M backwardly will throw the shaft D and circuit controller U back again and will again restore the circuit controller plate $b$ to its former position beneath the brush V'.

For equally moving both of the brushes V, V', to advance or retard their time of contact with the plate $b$, the double crank lever P, P' is raised or lowered through the agency of the lever Q operating about its fulcrum R. This is shown in Figs. 3, 3$^a$, 3$^b$, 3$^c$, 5 and 6, in which the elevated position of the brush holders H and H' is shown in Figs. 3$^b$ and 6, and the depressed position in Fig. 3$^c$ and Fig. 5. As it is necessary to change the timing of the spark to the different relation of the position of the crank of the main shaft when running in one direction, from that which it occupies when running in the other, it is necessary that there should be some differentiation of the advance of the two brushes V and V', and for this purpose the brush V may be advanced by the rocking of the double bell crank lever P, P' about its center Z independent of the conjoint upward and downward movement of the two brush holders H, H'. This is effected by the rod $t$ connected to an upward projection Y of the double bell crank, which rod $t$ is connected at its opposite end to the reversing switch T. This reversing switch is fulcrumed at its center $w$ and is adapted to drop into contact seats $s$, $s'$ alternately. This reversing switch T is in electrical connection through wire 1 with battery $b^t$ and the primary of the induction coil having the spark circuit $s^c$ and the other end of the primary wire is connected to any suitable portion of the engine frame.

The contact seats $s$, $s'$ are connected as follows. The seat $s$ through wire 2 is connected to the insulated spring G' placed beneath a contact plate E attached in insulated relation to one side of the friction switch B, and this contact plate through wire 5 is connected to brush V'. The other contact seat $s'$ of the reversing switch T is through wire 4 connected to another contact spring G placed beneath a contact plate E' attached in insulating relation to the lower side of the opposite end of the friction switch B and said contact plate E' is through wire 3 connected to brush V. Wire 2 is also by wire 7 connected to J and wire 4 is by wire 6 connected to J'.

The double-throw reversing switch T when moved from the seat $s'$ to $s$ will through rod $t$ push the lever arm Y, Z and consequently will rock the brush holders H and H' both in the same direction, the effect of which would be to advance the spark for the brush V and to retard it for V' whenever the shaft D is revolved in the direction of the arrow. The reversal of the switch T has a coactive relation also to the lever Q and cooperates therewith to place the lever Q in a certain predetermined position hereafter more fully described.

The action of my reversing device is as follows. Assuming that the shaft F is revolved clockwise or in the direction of the arrow in Fig. 1, then the contact piece E' will be in metallic contact with G through the effect of the drag caused by the brake effect of the disks A and C on the intermediate friction switch B. As long as the switch T is in the position on seat $s'$ the circuit can be made as follows: from the battery $b^t$, wire 1, switch T, seat $s'$, wire 4, spring G, contact E', wire 3, brush V to segment $b$, thence to the central shaft and engine frame to be returned to the battery. Now suppose it is desired to reverse the engine. The switch T is thrown into the other position in which it rests in electrical contact with the switch support $s$. If the lever Q is in such position that the engine will not reverse then the action of a cam W on the lever T will put the lever Q in such position that it will be advantageous for the reversing as will be hereinafter more fully described. When switch T is turned to the right into seat $s''$ the double arm bell crank P, P', Y, Z, will be pushed to the left by rod $t$ and the circuit controller brush V will be set in the advanced position of circuit timing. With the switch in seat $s$ there can be no closed circuit at all as the wire 2 connects $s$ and the piece G' where the circuit is broken, since G' is not in contact with E. Therefore the engine will begin to slow down, the engine not getting any spark at all. When the speed has dropped to that prescribed by the governor, the centrifugal force being lessened on the weights, springs S and S' straighten out and press the collar X into contact with the terminal J forcing it against J' and the circuit will now be through $s$, wire 2, wire 7, terminals J, J' (which are now in contact) and wire 6, piece G, plate E', wire 3 and the brush V. The engine is now turning over very slowly and when the contact is made at V the piston is on its compression stroke, the spark being rather far advanced. The explosion will then be powerful enough to overcome the momentum of the balance wheel and will start it rotating in the opposite direction. The contact between terminals J and J' will be broken with the centrifugal force of the weights I, I' and reversal in the direction of rotation will cause the friction switch B to move so that now E' and G will be separated and G' and E will be in contact. Simultaneously with the change of position of the friction switch B the bell crank and yoke L, M, will throw the cam shaft D longitudinally so that the circuit controller segment $b$ will come into contact with the brush V'. Now the action of the engine will proceed regularly as before since the brush holder V' has been moved to a position of retarded spark which will be suitable to get the engine into operation at the slow speed at which it will run before picking up its full load, the electric circuit being now through T, $s$, 2, G', E, wire 5 and brush V'.

In explaining more fully the timing of the spark when the engine is turning in either direction, I refer now to Figs. 3, $3^a$, $3^b$, $3^c$, 5, 6, the brush holders H, H', being independent of each other and being held at their inner ends by the shaft D. The rods N and O connect the outer ends to the double bell crank P, P'. When V' is working the engine is turning the shaft counter clockwise and to advance the spark it is necessary to raise the outer end of holder H'; when the brush V on holder H is working the engine has been reversed and so raising the outer end of brush on H will again advance the spark for this direction of movement. Therefore the main lever Q will have the same effect which ever way the engine is turning. To reverse, however, it is necessary to give the active brush more advance than the other, for if we did not the explosion on the return stroke on each side of the dead center, would have the same position and while the first one might start the engine reversing, the spark for the reverse running would be so far advanced as to prevent the engine from getting under way to full speed.

Figure 4A:
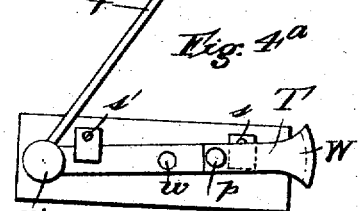
Figure 4:
Figure 10:
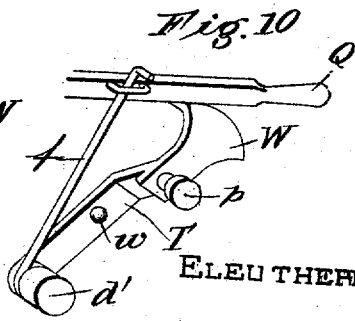

— I will now describe more in detail the action of the reversing switch T and its coactive relation to the lever Q by which this difficulty is met, reference being had more especially to Figs. 4, $4^a$ and 7, 8, 9, 10. I have already stated that it is necessary to have the lever Q in a certain position in reversing and I will now describe how this position is determined with certainty by the reversing switch T. The timing result is accomplished by the switch T and rod $t$ acting on crank Y, Z. This throws one brush down and the other up. The light rod $t$ is attached to a pin $p$ on switch lever T to move the crank Y, Z, to the right or left when the reversing switch T is thrown from one side to the other. This action will be independent, or nearly so, of the lever Q which can still be moved within its limits. In order that the brush holders shall assume an exact and definite position every time the switch is thrown, a cam W, Figs. 4, $4^a$, 7, 8, 9 and 10 is so arranged that if lever Q is too far down it will be raised by cam W. But if the operator should have left the lever Q too high or too far from the switch, then a small hook $f$ pivoted on the handle $d'$ of switch T will pull down on lever Q as seen in Fig. 10 at the same time that rod $t$ moves the crank Y, Z.

In carrying out my invention, I do not confine myself to the particular construction shown and described as many of the details may be varied without departing from my invention. I do not, for instance, confine my invention to the friction brake switch B, for controlling the longitudinal shifting of the shaft by the direction of revolution. In Fig. 11, I have shown a modification of these parts in which D is the main shaft and $C^2$ a hub rigid thereon. Two peripheral grooves $E^2$, $F^2$ are formed in the hub side by side and having an oblique communicating passageway at $x^2$. $A^2$, $B^2$ are two switch tongues pivoted between the grooves and having springs $y^2$ that normally hold them across the two grooves. $G^2$ is a transverse pin which plays in either one of the two grooves according to the direction of movement of the hub $C^2$. When the hub is rotating in the direction of the full line arrow, the traverse pin $G^2$ will take and stay in groove $E^2$, the spring tongue $A^2$ yielding as in dotted lines to allow it to pass, but when the direction of revolution is reversed, as indicated by the dotted arrow, the traverse pin $G^2$ takes the passageway $x^2$ and passes into and stays in groove $F^2$, the spring tongue $B^2$ then yielding and allowing the pin to pass. The shifting of pin $G^2$ to the dotted position is made through any suitable mechanism to shift the shaft D longitudinally.

I claim—

1. A gas engine reversing switch, comprising a rotary shaft bearing a rotary circuit controlling contact, two independently movable brush holders with brushes, means for adjusting the brush holders to change the timing of the contact and means for shifting the controlling contact from the plane of one brush to the plane of the other brush.

2. A gas engine reversing switch, comprising a rotary shaft bearing a rotary circuit-controlling contact, two independently movable brush holders hung upon opposite sides of the shaft and bearing brushes, means for adjusting the brush holders to change the timing of contact, and means for shifting the controlling contact from the plane of one brush holder to the plane of the other brush holder.

3. A gas engine reversing switch comprising a rotary shaft having a rotary circuit controlling contact, two independently movable brush holders with brushes, means for moving both brush holders in opposite directions, and means for moving both brush holders in the same direction.

4. A gas engine reversing switch, comprising a rotary shaft made longitudinally adjustable and having a rotary circuit-controlling contact, two independently movable brush holders with brushes, means for timing the contact of the brushes with the rotary contact, a shifting device controlled by the direction of revolution of the shaft, and means for translating the movement of this device into a longitudinal adjustment of the shaft in one direction or the other according to the direction of revolution of the shaft.

5. A gas engine reversing switch, comprising a rotary shaft having a rotary circuit controlling contact, two independently movable brush holders with brushes, means for adjusting the brush holders to change the timing of the contact, a shifting device controlled by the direction of the revolution of the shaft and two pairs of circuit closing contacts connecting with the shifting device whereby one is opened when the other is closed, and circuit wires connecting these contacts respectively with the two brushes.

6. A gas engine reversing switch, comprising a rotary shaft bearing a rotary circuit controlling contact, two independently movable brush holders with brushes, means for adjusting the brush holders to change the timing of the contact, an electric circuit with branches running to each brush, and an automatic governor switch consisting of a centrifugal governor on the shaft, and a pair of terminal contacts arranged to be closed by the slowing down of the governor to shift the circuit from one circuit controlling brush to the other.

7. A gas engine reversing switch, comprising a rotary shaft bearing a rotary circuit controlling contact, two independently movable brush holders hung upon opposite sides of the shaft and bearing brushes, and a double acting brush holder adjusting device consisting of a double bell crank whose opposite arms are attached respectively to the two brush holders, a main lever pivoted at its inner end to the middle of the double bell crank, a reversing electrical switch lever, and a rod connecting the same to the double bell crank for giving a secondary movement to the latter, simultaneously with the shifting of the switch lever.

8. A gas engine reversing switch, comprising a rotary shaft bearing a rotary circuit controlling contact, two independently movable brush holders hung upon opposite sides of the shaft and having brushes, and a double acting brush holder adjusting device consisting of a double bell crank whose opposite arms are attached respectively to the two brush holders, a main lever pivoted at its inner end to the middle of the double bell-crank, a reversing electrical switch lever, a rod connecting the same to the double bell-crank for giving a secondary movement to the latter and a coupling device connecting the switch lever and main lever for establishing a definite relation between the two.

ELEUTHERE PAUL DU PONT.

Witnesses:
CHARLES G. GUYER,
S. E. BECKER.